US009432086B2

(12) United States Patent
Chew

(10) Patent No.: US 9,432,086 B2
(45) Date of Patent: *Aug. 30, 2016

(54) METHOD AND SYSTEM FOR AUTHORIZING EXECUTION OF AN APPLICATION IN AN NFC DEVICE

(71) Applicant: INSIDE SECURE, Meyreuil (FR)

(72) Inventor: Gary Chew, Aix-en-Provence (FR)

(73) Assignee: Inside Secure, Meyreuil (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/369,550

(22) PCT Filed: Oct. 9, 2012

(86) PCT No.: PCT/FR2012/052289
§ 371 (c)(1),
(2) Date: Jun. 27, 2014

(87) PCT Pub. No.: WO2013/102708
PCT Pub. Date: Jul. 11, 2013

(65) Prior Publication Data
US 2014/0364058 A1 Dec. 11, 2014

(30) Foreign Application Priority Data

Jan. 3, 2012 (FR) ..................... 12 50051

(51) Int. Cl.
*H04B 5/00* (2006.01)
*G06F 21/12* (2013.01)
*G06F 21/34* (2013.01)
*G06Q 10/00* (2012.01)
(Continued)

(52) U.S. Cl.
CPC ............ *H04B 5/0031* (2013.01); *G06F 8/00* (2013.01); *G06F 8/61* (2013.01); *G06F 21/123* (2013.01);
(Continued)

(58) Field of Classification Search
CPC ..... H04W 12/06; H04W 4/008; H04W 4/00; H04W 12/08; H04W 88/02; H04W 4/001; H04L 63/10; H04L 63/0853; H04L 67/34; H04M 1/7253; H04M 2250/04; H04B 5/0031; G06F 21/123; G06F 21/34; G06F 8/00; G06F 8/61; G06Q 20/38
See application file for complete search history.

(56) References Cited

U.S. PATENT DOCUMENTS 7,098,770 B2 8/2006 Charrat et al.
2007/0198834 A1* 8/2007 Ksontini ............ H04L 63/0853
455/411

(Continued)

FOREIGN PATENT DOCUMENTS

FR 2 935 510 A1 3/2010
WO WO 02/33644 A1 4/2002

OTHER PUBLICATIONS

Dec. 12, 2012 International Search Report issued in International Application No. PCT/FR2012/052289.

(Continued)

*Primary Examiner* — Alejandro Rivero

(57) ABSTRACT

A method for executing an application in an NFC device, including steps during which: a contactless link is established between a first and a second NFC devices, the first NFC device transmits through the contactless link an identifier memorized by the first NFC device, the second NFC device transmits through the contactless link an application identifier, the second NFC device transmits to an application server the identifier of the first NFC device and the application identifier, the application server transmits to an authentication server the identifier of the first NFC device and the application identifier, the authentication server verifies the identification data, and if the first NFC device and the application are identified, the authentication server authorizes the two NFC devices to execute the application by transmitting to the application server an identifier of a user of the first NFC device, corresponding to the identifier of the first NFC device.

29 Claims, 6 Drawing Sheets

(51) Int. Cl.
    *G06Q 20/32* (2012.01)
    *H04W 12/06* (2009.01)
    *G06F 9/44* (2006.01)
    *G06F 9/445* (2006.01)
    *G06Q 20/38* (2012.01)
    *H04W 88/02* (2009.01)
    *H04W 4/00* (2009.01)
    *H04L 29/08* (2006.01)

(52) U.S. Cl.
    CPC ............... *G06F 21/34* (2013.01); *G06Q 10/00* (2013.01); *G06Q 20/3278* (2013.01); *G06Q 20/382* (2013.01); *H04W 12/06* (2013.01); *H04W 88/02* (2013.01); *H04L 67/34* (2013.01); *H04W 4/001* (2013.01); *H04W 4/008* (2013.01)

(56) References Cited

U.S. PATENT DOCUMENTS

| | | | | |
|---|---|---|---|---|
| 2009/0247077 | A1* | 10/2009 | Sklovsky | ............... G06F 9/445 455/41.1 |
| 2010/0058463 | A1 | 3/2010 | Bertin | |
| 2012/0149302 | A1* | 6/2012 | Sekiya | ............... G06Q 20/3278 455/41.1 |

OTHER PUBLICATIONS

International Preliminary Report on Patentability issued in International Patent Application No. PCT/FR2012/052289 completed on Jun. 5, 2014.

\* cited by examiner

IDDB

| SEID | UID |
|---|---|
| ... | ... |
| ... | ... |
| ... | ... |
| ... | ... |

| UID | KIX |
|---|---|
| ... | ... |
| ... | ... |
| ... | ... |
| ... | ... |

| UID | APID |
|---|---|
| ... | ... |
| ... | ... |
| ... | ... |
| ... | ... |

Fig. 4A

UPDB

| NID | UID |
|---|---|
| ... | ... |
| ... | ... |
| ... | ... |
| ... | ... |

| UID | PRFX | UPRF |
|---|---|---|
| ... | ... | ... |
| ... | ... | ... |
| ... | ... | ... |
| ... | ... | ... |

Fig. 4B

ARDB

| PVID | APID |
|---|---|
| ... | ... |
| ... | ... |
| ... | ... |
| ... | ... |

| APID | DRF | URL |
|---|---|---|
| ... | ... | ... |
| ... | ... | ... |
| ... | ... | ... |
| ... | ... | ... |

| PVID | KIX |
|---|---|
| ... | ... |
| ... | ... |
| ... | ... |
| ... | ... |

Fig. 4C

KYDB

| KIX | KEY |
|---|---|
| ... | ... |
| ... | ... |
| ... | ... |
| ... | ... |

Fig. 4D

METHOD AND SYSTEM FOR AUTHORIZING EXECUTION OF AN APPLICATION IN AN NFC DEVICE

The present invention relates to the installation and execution of a secure application in a portable device of the type mobile phone or the like.

The present invention also relates, but not exclusively, to the NFC technology (Near Field Communication) as well as to architectures of NFC devices or "NFC chipset", i.e. chipsets comprising at least one NFC component.

The NFC technology is currently developed by an industrial consortium gathered under the name of NFC Forum (http://www.nfc-forum.org). The NFC technology derives from the RFID technology (Radio Frequency Identification) and uses NFC controllers having several operating modes, in particular a Reader Mode, a Card Emulation Mode and a Peer-to-Peer Mode.

Significant developments have been made during these last years to integrate a NFC controller into handheld objects of the type mobile phone or the like (for example Personal Digital Assistants PDA having a mobile phone function). The aim of this integration is in particular to provide such handheld objects with a payment or access control application (metro, bus, etc.), and with other NFC technology applications such as tag or contactless electronic card reading.

FIG. 1 shows a NFC device of the type Handheld Device HD such as a mobile phone, a PDA (Personal Digital Assistant) etc. The device HD comprises a NFC controller referred to as NFCC and at least one host processor HP1, HP2 connected to controller NFCC through a bus BS1, for example of SWP type ("Single Wire Protocol"). A host processor HP2 may be a Universal Integrated Circuit Card UICC, for example of the type SIM card (Subscriber Identity Module). A host processor HP1 may also be the baseband processor of a mobile phone (i.e. the processor managing phone calls). In this case, host processor HP1 may be connected to controller NFCC by means of an asynchronous link BS2 managed by UART ports ("Universal Asynchronous Receiver Transmitter"). If desired, processor HP2 may also be directly connected to processor HP1 through a bus BS3 of the type ISO 7816.

The resources of controller NFCC are put at the disposal of host processor HP1 to allow it to manage contactless applications RAPi, CAPi. Controller NFCC comprises a host controller HC and a Contactless Front End Interface CLF provided with an antenna coil AC1. In practice, the host controller HC and the interface CLF may be made on a same semiconductor chip, like the MicroRead® chip commercialized by the applicant, or be formed by two different chips, like the chips "PicoRead® Microcontroller" and "Pico Read® RF Interface" commercialized by the applicant.

The interface CLF of controller NFCC may generally operate according to several RF technologies, for example of "Type A" such as defined by ISO/IEC 14443 parts 2, 3 and 4, of "Type B" such as defined by ISO/IEC 14443-2 with a standard framing such as defined by ISO/IEC 14443-3, and of "Type F" such as defined by ISO 18092 as passive mode at 212 and 424 kb/s (kilobytes per second) or by the Japanese industrial standard JIS X 6319-4. Each RF technology, or contactless communication protocol, defines a transmit frequency of the magnetic field, a modulation method of the magnetic field to transmit data in active mode, a load modulation method to transmit data in passive mode, a data coding method, a data frame format, etc.

Examples of application of the NFC device are shown by FIG. 2 which represents a handheld device HD provided with the NFC device of FIG. 1, the device HD here being a mobile phone. There are reader applications RAP and card applications CAP.

Reader Applications (RAP)

Controller NFCC operates like an NFC reader to perform a transaction with a Contactless Integrated Circuit CIC. A reader application RAP, RAPi is executed by host processor HP1 (Cf. FIG. 1). The latter places interface CLF in an active operating mode where it emits a magnetic field FLD, sends data by modulating the magnetic field and receives data by load modulation and inductive coupling. This type of application may be free (for example reading an electronic tag in a bus shelter containing the bus schedule) and may be executed by a non secure processor. Host processor HP1 may in this case be the baseband processor of the mobile phone. If it is a paying application, the host processor executing the application is preferably a secure processor, for example a SIM card processor, because the service access requires an identification/authentication of the subscriber.

Card Applications (CAP)

The operating principle of the card emulation mode is described by the patent EP 1 327 222 (U.S. Pat. No. 7,098,770) in the name of the applicant. A card application CAP, CAPi is executed by host processor HP1 (Cf. FIG. 1). The latter places controller NFCC in a passive operating mode and forms with controller NFCC, the equivalent of a contactless integrated circuit, which is seen by a reader RD as a contactless card. Thus, controller NFCC does not emit any magnetic field, receives data by demodulating a magnetic field FLD emitted by reader RD and sends data by modulating the impedance of its antenna circuit AC1 (load modulation). The concerned applications are usually applications of payment or paying access control (payment machines, metro entrances, etc.). The handheld device HD is therefore used in this case like a chip card. This type of application is most often secure and host processor HP1, HP2 which executes the application program is then a secure processor, for example a processor of SIM card, comprising encryption functions for the user authentication and/or the authentication of the handheld device in relation to a transaction terminal.

Various architectures of NFC devices dedicated to telephony have been considered, some using the SIM card processor to manage the NFC applications, other providing a second secure processor, both solutions may also be combined.

Due in particular to a significant number of involved elements and the complexity of the relationships between those elements, the implementation of a secure application in an NFC device raises difficulties slowing down the commercial development of secure NFC applications. Indeed, the handheld device, the secure processor and the controller NFCC are produced by different manufacturers. The secure processor (SIM card) is usually given to a final user by a mobile network operator, after receiving security information such as identifiers, secret keys and certificates linked to the user. The handheld device may be given to the final user by the mobile network operator or another entity. The application is performed by a software developer. If it involves payment transactions, the application is certified by a certification organization linked to a banking organization. A software component of an application, currently called "applet", is securely installed in the secure host processor and customized with identification data of the user and the handheld device and encryption keys specific to the application and user. The user is also securely referenced to a banking organization. A payment transaction involves a payment terminal which is produced by another manufacturer, and which must also be certified by a certification organization. The user of the payment terminal, a retailer, must also be referenced securely to a banking organization. Mobile network operators are generally reluctant to make the SIM card security functions and data available to others such as secure application providers or card payment services. The result is that installing an application requiring a user authentication in a handheld device raises numerous issues. These issues appear each time an application must be installed in particular in a secure processor of the handheld device, and in particular when a user changes his/her handheld device (mobile phone) and must reinstall the applications previously installed in an old handheld device.

In addition, confronted to a small number of available applications, mobile phone manufacturers find no interest in increasing the cost of their phones by integrating a NFC controller and if need be an additional secure processor.

It may therefore be desired to make an architecture for deploying NFC applications, which does not require mobile network operators to be involved, while offering if necessary a security level complying with payment and paying access control services. It may also be desired that this architecture does not require the implementation of a trusted centralized server to guarantee the management (emission, control, cancellation) of secret data allocated to each mobile phone for each application. It may also be desired that each NFC application installed in a handheld device is not attached to a particular handheld device, but may be easily activated in another handheld device. It may also be desired that the provider of an application may easily allow the user to access the application, by minimizing his/her involvement, and without involving the mobile network operator or other entities. It may also be desired to guarantee the user anonymity when s/he executes an NFC application, and in particular to avoid a third person to establish a link between an NFC device and the identity of the NFC device user.

Embodiments may relate to a method for executing an application in an NFC device, the method comprising steps during which: a contactless link is established between a first NFC device and a second NFC device, the first NFC device transmits through the contactless link an identifier memorized by the first NFC device to the second NFC device, the second NFC device transmits through the contactless link an application identifier to the first NFC device, the second NFC device transmits to an application server the identifier memorized by the first NFC device and the application identifier, the application server transmits to an authentication server the identifier memorized by the first NFC device and the application identifier, the authentication server verifies from the identifier memorized by the first NFC device that the first NFC device is authorized to execute the application identified by the application identifier, and if the first NFC device is authorized to execute the application, the authentication server authorizes the execution of the application by transmitting to the application server an identifier of a user of the first NFC device, corresponding to the identifier memorized by the first NFC device.

According to an embodiment, the identifier memorized by the first NFC device is periodically modified by the authentication server which keeps up to date a link between the user identifier and the identifier memorized by the first NFC device.

According to an embodiment, the identifier of the first NFC device identifies a secure processor of the first NFC device, the secure processor transmits through the contactless link first authentication data allowing the secure processor of the first NFC device to be authenticated, the second NFC device transmits to the application server the first authentication data, the application server transmits to the authentication server the first authentication data and second authentication data allowing the application corresponding to the application identifier to be authenticated, and the authentication server verifies the authentication data, the two NFC devices to being authorized to execute the application only if the secure processor and the application are authenticated.

According to an embodiment, the first NFC device transmits to the authentication server an application installation request comprising the application identifier of an application to be installed, and the first is authentication data allowing the secure processor of the first NFC device to be authenticated, the authentication server verifies the first authentication data, and if the secure processor is authenticated, transmits to the first NFC device an address for downloading the application, and the first NFC device downloads the application from the received download address and installs the downloaded application.

According to an embodiment, after the application installation, the first NFC device informs the authentication server of the application installation by supplying thereto the identifier of the installed application and the first authentication data, and the authentication server verifies the first authentication data, and if the secure processor is authenticated, the authentication server memorizes the application identifier in association with the secure processor identifier of the first NFC device.

According to an embodiment, the authentication server does not transmit to the first NFC device an address for downloading the application if the application identifier is already memorized in association with the secure processor identifier of the first NFC device.

According to an embodiment, the authentication server does not authorize the execution of the application by the two NFC devices if the application identifier is not memorized in association with the secure processor identifier of the first NFC device.

According to an embodiment, the first authentication data comprise the secure processor identifier and a first cryptogram calculated by the secure processor by applying to the secure processor identifier an encryption calculation using a secret key memorized by the secure processor.

According to an embodiment, the second authentication data comprise the secure processor identifier, the application identifier and a second cryptogram calculated by the application server by applying an encryption calculation to the application identifier, using a secret key specific to the application.

According to an embodiment, the second cryptogram is calculated by applying the encryption calculation to the application identifier, and to the first cryptogram.

According to an embodiment, the first and/or second cryptograms are calculated using a symmetric encryption algorithm using a secret key, or an is asymmetric encryption algorithm using a private key, or a hashing function applied to the data to be ciphered and the secret key.

According to an embodiment, verifying each of the first and second cryptograms is performed by recalculating the cryptogram from the same data and by using an encryption key accessible to the authentication server.

Embodiments may also relate to a system for executing a secure application in an NFC device, comprising: a first NFC device comprising an NFC component for establishing a contactless communication with another NFC device, and a secure processor connected to the NFC component, a second NFC device connected to an application server to execute an application with another NFC device, the system comprising an authentication server accessible to the application server and to the first NFC device, the system being configured to execute the method as previously defined.

Embodiments may also relate to a set of a secure processor coupled to an NFC component configured to establish a contactless communication with an NFC device, the secure processor comprises a software component associated with an secure processor identifier, configured to: establish a contactless communication with an NFC device through the NFC controller, and transmit the identifier through the contactless link, receive through the contactless link an application identifier, and transmit through the contactless link authentication data of the software component.

According to an embodiment, the software component is configured to verify if the received application identifier is in a list of applications memorized by the secure processor or not.

According to an embodiment, the authentication data comprise the secure processor identifier and a first cryptogram calculated by the secure processor by applying to the secure processor identifier, an encryption calculation using a secret key memorized by the secure processor.

According to an embodiment, the first cryptogram is calculated by the secure processor using a symmetric encryption algorithm using a secret key, or an asymmetric encryption algorithm using a private key, or a hash function applied to the data to be ciphered and to the secret key.

Embodiments of the invention will be described hereinafter, in relation with, but not limited to the appended figures wherein:

FIG. 1 previously described schematically shows the architecture of a conventional NFC device;

FIG. 2 previously described schematically shows examples of applications implemented in the NFC device;

FIG. 3 schematically shows the architecture of an NFC application deployment system;

FIGS. 4A to 4D show tables of one or more data bases used by the deployment system;

Figure 1:
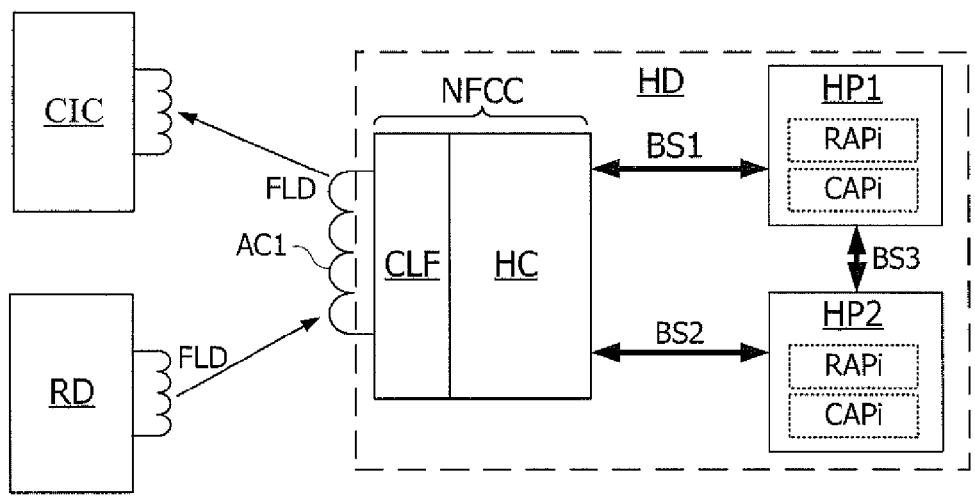
Figure 2:
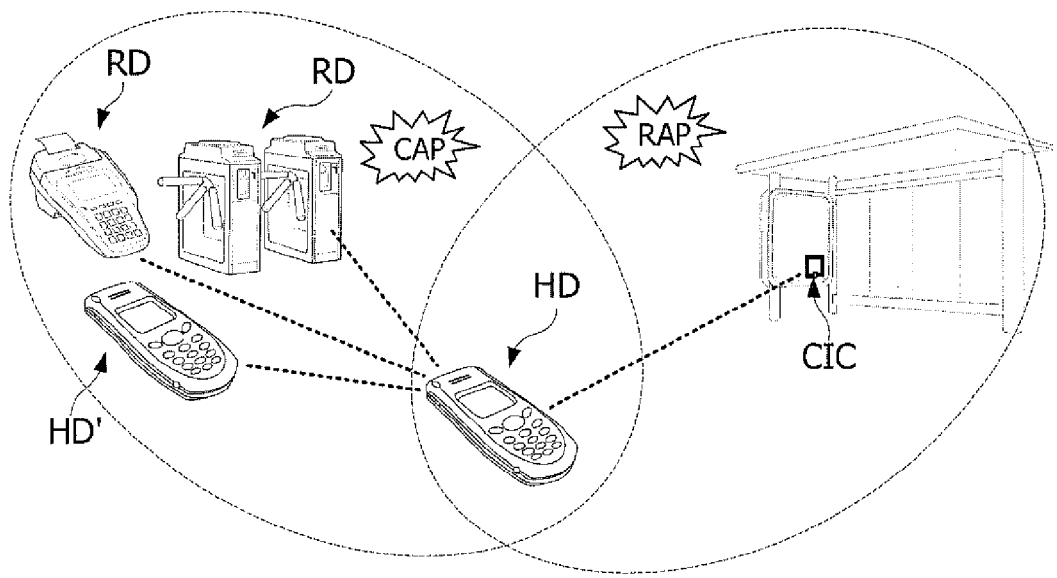
Figure 3:
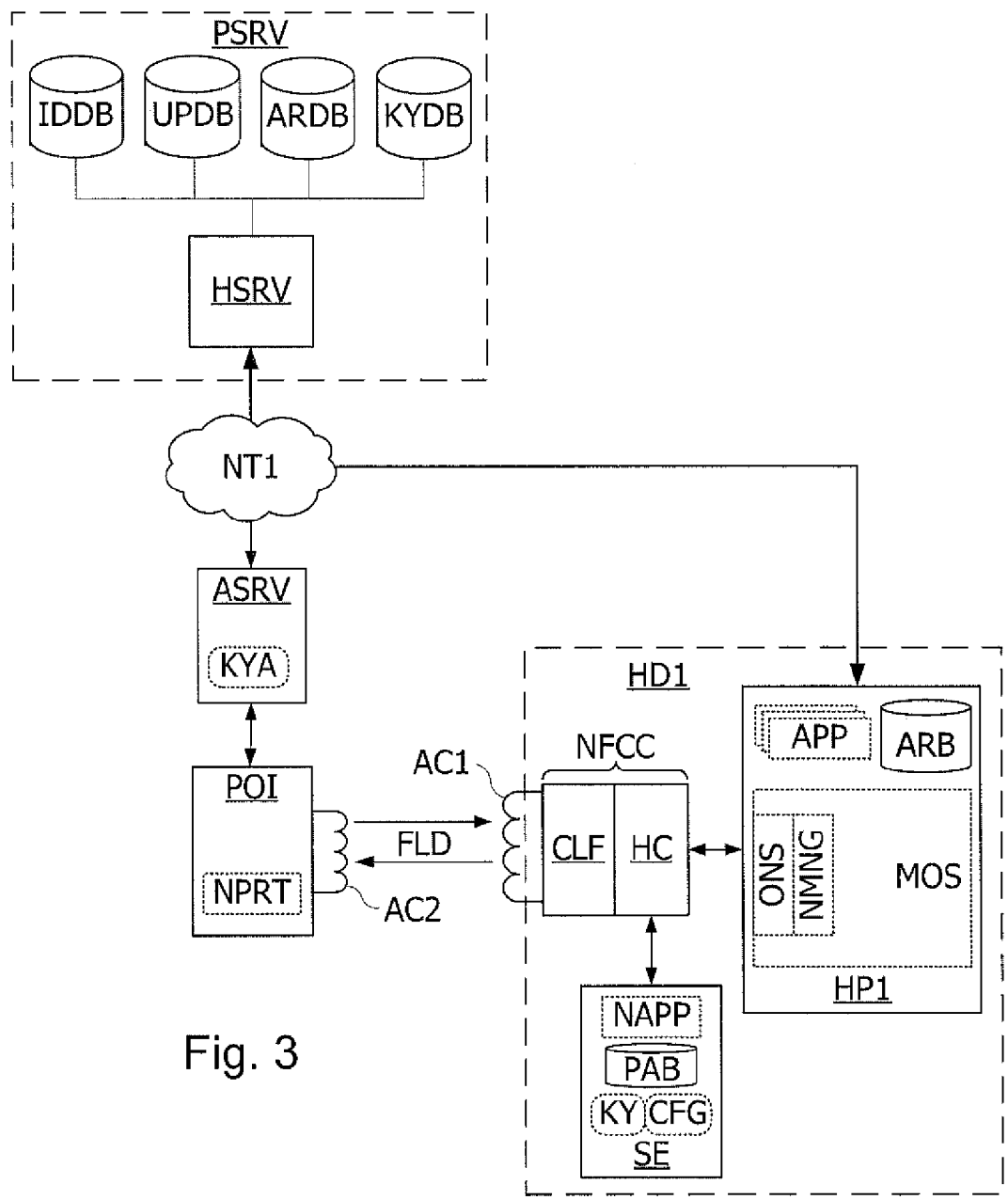

FIG. 3 shows the architecture of an NFC application deployment system. The application deployment system comprises a plurality of handheld NFC devices HD1 and interaction devices POI with which devices HD1 may establish a NFC contactless communication. Devices POI may be NFC contactless readers or NFC contactless integrated circuits. Devices POI are each connected or connectable to an application server ASRV allowing a transaction to be executed as part of an application, with a device HD1 connected to device POI. Device POI comprises an antenna AC2 to establish contactless NFC communications with an NFC device. Device POI may be connected to server ASRV either directly, or through one or more data transmission networks.

Device HD1 comprises host processors HP1, SE and an NFC component referred to as NFCC. Processor HP1 is for example a baseband processor of mobile phone, and host processor SE is a secure processor. Component NFCC comprises a host controller HC connected to processors HP1 and SE and an NFC interface circuit referred to as CLF connected to an antenna circuit AC1. Processor HP1 comprises a MOS operating system and can execute one or more applications APP installed in a memory of processor HP1 (or accessible to processor HP1). Processor SE may be the is processor of a SIM card or a different processor having at least the same level of security.

According to one embodiment, the MOS operating system comprises driver software ONS allowing processor HP1 to access some functions of processor SE through controller NFCC and to receive notifications emitted by processor SE. Processor HP1 also comprises an application database ARB comprising secure application references APP installed in the memory of processor HP1. Processor SE comprises an application software component called "NAPP applet", an identifier of processor SE and an identifier of component NAPP, encryption keys KY, a list PAB of identifiers of secure applications installed in device HD1, and configuration data of device HD1 (type of device, name and version of the MOS operating system, etc.). The secure applications APP may be payment, access control applications, and more generally, applications requiring an authentication. The software component NAPP may also memorize configuration information CFG of device HD1, the information comprising in particular a type of device and a version number of the MOS operating system. The MOS operating system also comprises a secure application control software NMNG communicating with software component NAPP through driver ONS and controller NFCC. Software NMNG is configured to collect configuration information of device HD1, and transmit them to processor SE. Software NMNG is linked in a unique way to software component NAPP so as to mask the presence of the software component to the other applications installed in processor HP1. Thus, only software NMNG is notified when software component NAPP is called through a contactless link established by controller NFCC, to execute a secure application. Software NMNG also performs a function for managing the preferences of the user of device HD1.

The application deployment system comprises a database server HSRV giving access to one or more databases IDDB, UPDB, ARDB, KYDB. Software NMNG also performs a function of interface between server HSRV and software component NAPP. Server HSRV manages identifiers of software components NAPP installed in the processors SE of devices HD1, identifiers of application providers, and supplies authentication services. During its manufacture, the processor SE of each device HD1 receives unique identifiers SEID and NID of processor SE and software component NAPP, symmetric encryption secret keys and/or asymmetric encryption public and private keys associated to a certificate. Server HSRV performs functions of registering and removing users, processors SE, software components NAPP, application providers and applications. Each application is therefore identified by a unique application identifier.

The content of database(s) IDDB, UPDB, ARDB, KYDB is shown in FIGS. 4A to 4D. In FIG. 4A, database IDDB is configured to establish a correspondence between identifiers SEID, NID of processor SE and of software component NAPP of each processor SE commissioned in a device HD1. The base IDDB also establishes a correspondence between identifier NID and a key index KIX for accessing the associated encryption keys, memorized by processor SE. Database IDDB is therefore completed each time a processor SE is commissioned in a device HD1. The database IDDB also comprises a look-up table between identifiers of software components NID installed in a processor SE and application identifiers ARef, this table therefore indicates if an application having as identifier ARef is installed in a device HD1 whose software component NAPP corresponds to identifier NID. Base IDDB is therefore also updated each time an application is installed in or erased from a device HD1.

In FIG. 4B, database UPDB is configured to establish a correspondence between an identifier NID allocated to software component NAPP and a user identifier UID having processor SE installed in device HD1, as well as a correspondence between identifier UID and an index PRFX referencing profile information UPRF relating to the user of device HD1. As a user may have several processors SE, a user identifier UID may be associated in table UPDB to several identifiers NID of software components NAPP installed in a processor SE. Database UPDB is completed during the installation of a first application in a device HD1, and updated each time the profile information of a user is modified.

In FIG. 4C, database ARDB is configured to establish a correspondence between application provider identifiers PVID and application identifiers APID for a type of device HD1, a correspondence between each identifier PVID and an encryption key index KIX allowing encryption keys KIX specific to the application provider to be accessed. Base ARDB also establishes a correspondence between each application identifier APID and a reference DRF of type of device HD1 in which the application may be installed and executed, and between each reference DRF and a URL address for downloading the application corresponding to identifier APID. Each identifier APID thus allows each application instance adapted to a type of device HD1 to be identified and an address for downloading the application instance to be accessed. Base ARDB is updated each time a new application provided for a type of device HD1 is saved.

In FIG. 4D, database KYDB is configured to establish a correspondence between each key index (of processor SE or application provider) and encryption keys. The access to database KYDB may be protected by a specific server configured to receive key indexes KIX and data to be ciphered or deciphered and to supply in response cryptograms resulting from the ciphering or deciphering of the data supplied by means of the keys referenced by the supplied key index KIX. Base KYDB is therefore modified each time a new processor SE is commissioned and each time a new application for a type of device HD1 is saved.

According to one embodiment, each identifier NID allocated to each user in base UPDB is modified from time to time, for example periodically, by server HSRV. Server HSRV also performs the modification in base IDDB and provides the concerned device HD1 with the new identifier NID to be used, for example in a message indicating the old and new identifier NID. Each device HD1 s configured to receive and process such a message by transmitting the old and new identifier NID to processor SE. Processor SE is configured to memorize the new identifier NID instead of the old one only if the old identifier received corresponds to that memorized by processor SE. Processor SE sends to server HSRV through device HD1 an update report message indicating if the update of identifier NID has been performed or not. Server HSRV may repeat the operation until the update is performed by processor SE. Admittedly, bases UPDB and IDDB are updated only when processor SE has sent to server HSRV a report message indicating it has performed the update.

Figure 5:
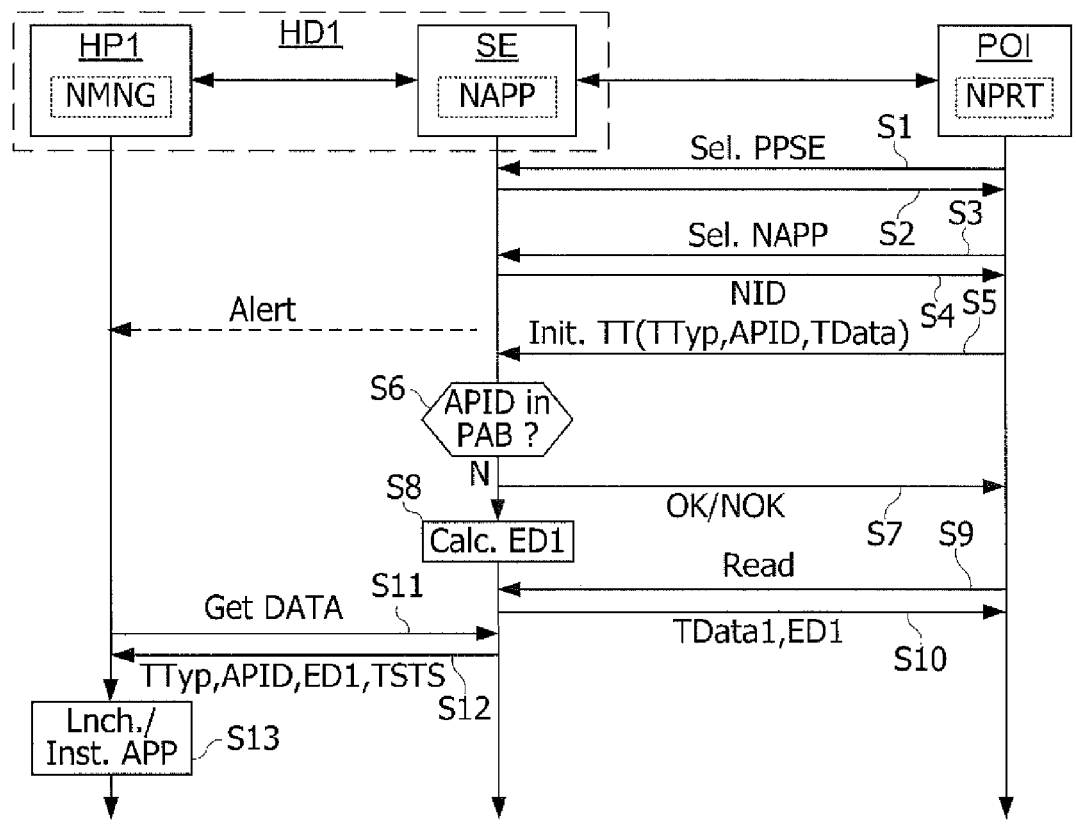
FIG. 5 shows steps for activating a transaction implying the execution of an application, between a secure host processor of the NFC device and a NFC reader, according to one embodiment.

FIG. 5 shows a sequence of steps S1 to S13 triggered when a device HD1 is placed in contactless communication with a device POI. This sequence is executed by software component NAPP installed in processor SE of device HD1 put in communication with device POI through controller is NFFCC, by contactless reader software NPRT installed in device POI and by management software NMNG of processor HP1.

At step S1, software NPRT sends, if need be, a message for selection a payment application PPSE (Proximity Payment System Environment) to controller NFCC. Controller NFCC forwards message PPSE to processor SE. At step S2, processor SE answers to the selection message. At step S3, reader software NPRT sends to processor SE a message for selecting the software component NAPP installed in processor SE. Indeed, several other software components may be installed in processor SE. At step S4, software component NAPP answers to software NPRT by providing it with its identifier NID. At step S5, device POI sends a transaction initialization message comprising information on the type of transaction TTyp, an application identifier APID, and transaction data. At step S6, software component NAPP verifies if identifier APID is in the list PAB of identifiers of applications installed in processor HP1 or not. At step S7, software component NAPP answers to the initialization message by indicating if application ARID is installed in processor HP1 or not. Whatever the answer of software component NAPP, device POI executes step S9 where it emits a read order. At the same time, at step S8 software component NAPP launches an encryption calculation to obtain a cryptogram ED1. After receiving the read order at step S9, software component NAPP emits in response at step S10 cryptogram ED1, as well as standard payment transaction data DATA1 if the application requested is installed. It is to be noted that steps S1 to S9 comply with the card payment standard EMV (Europay, MasterCard and Visa).

During steps S3 to S8, software component NAPP emits an alert toward management software NMNG installed in processor HP1, to inform it has been called through controller NFCC. At step S11, software NMNG transmits to software component NAPP a data request message. At step S12, software component NAPP transmits in response to software NMNG the type of transaction TTyp received, application identifier APID, cryptogram ED1 and state information STS. At step S13, software NMNG launches the application in processor HP1 or a procedure for installing this application if it is not installed.

Cryptogram ED1 is for example calculated by applying an encryption function such as a symmetric encryption function like AES (Advanced Encryption Standard) using a key memorized by processor SE, to identifier NID, application identifier APID, and possibly other data. Cryptogram ED1 may also be calculated by means of a hash function such as SHA (Secure Hash Algorithm) or MD5 (Message Digest 5) applied to the same data, as well as to the key memorized by processor SE. Cryptogram ED1 may also be calculated by an asymmetric encryption function using a private key memorized by processor SE, the corresponding public key being memorized in base KYDB. The other data used in the calculation of cryptogram ED1 are transmitted with it to allow it to be verified after.

Figure 6:
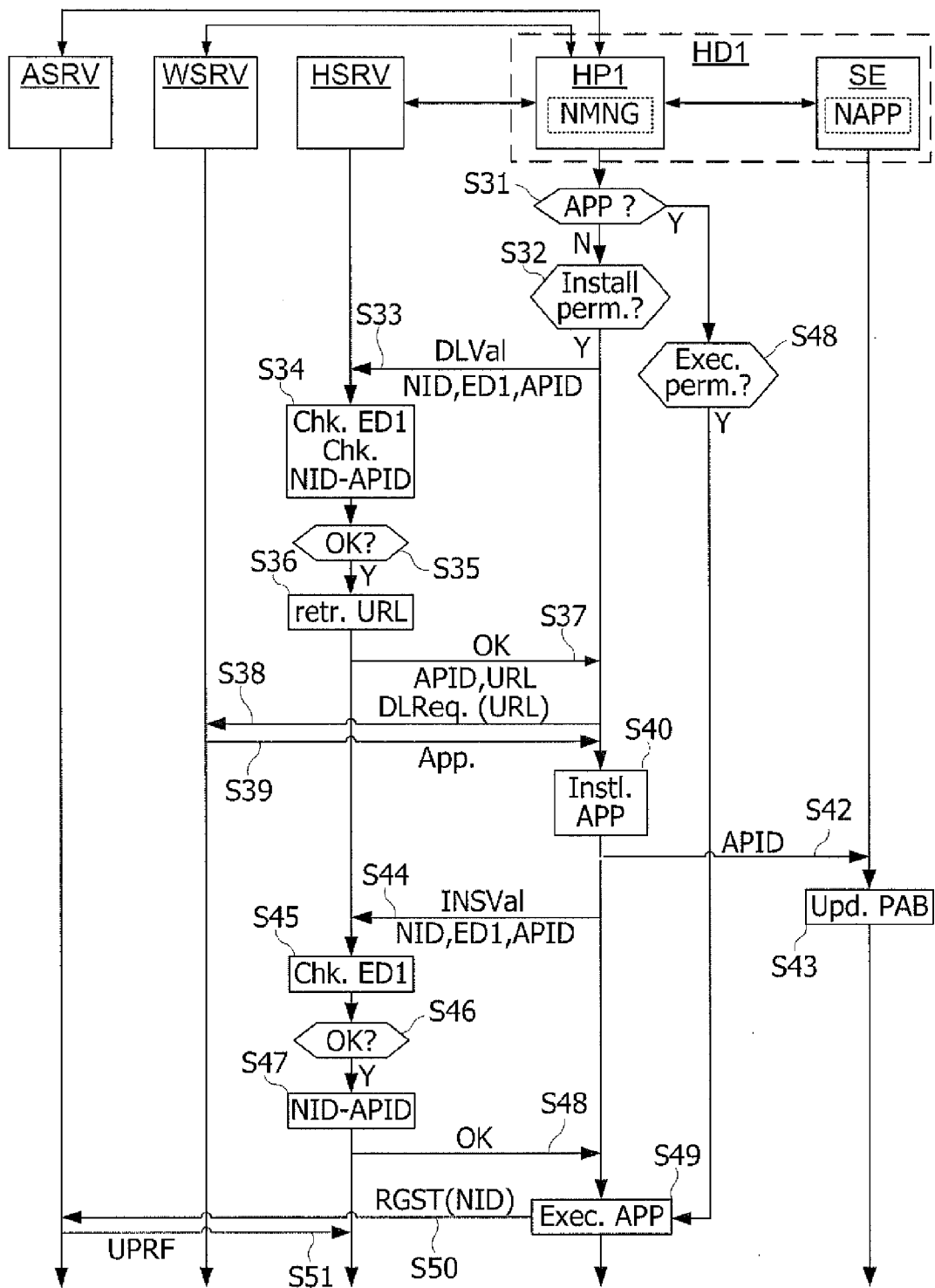
FIG. 6 shows steps for installing and executing an application in a NFC device, according to one embodiment.

FIG. 6 shows a sequence of steps S31 to S52 which may be executed at step S13 by device HD1, and by servers HSRV and ASRV. At step S31, software NMNG of processor HP1 determines if the application having as identifier APID is installed in device HD1 by consulting database ARB. If the application is already installed, processor HP1 executes step S48 where it may be provided to ask the user if s/he accepts to activate the application. If the user accepts to activate the application, the application is launched at step S49. If the application is not installed in device HD1, processor HP1 executes step S32 where it may be provided to ask the user if s/he wishes to install the application in device HD1. If the user accepts to install the application, processor HP1 emits a download validation request DLVal toward server HSRV, this request coming with the identifier of a software component NID, cryptogram ED1 calculated at step S7, and application identifier APID to be downloaded. At step S34, server HSRV receives this request and verifies cryptogram ED1 by means of identifier NID and the information contained in databases IDDB, UPDB and KYDB, and verifies the existence of the application identifier in base ARDB. Server HSRV also verifies that the application has not already been installed in device HD1 by verifying in base IDDB that identifier NID is not already linked to application identifier APID. Verifying the link between identifier NID and the application identifier may take into account that the application being installed is an update of an application previously installed in device HD1. In this case, the installation is authorized by server HSRV. At step S35, if all these verifications are satisfied, server HSRV executes step S36 where it determines a download URL address of the application by accessing base ARDB by means of identifier APID. At step S37, server HSRV answers to request DLVal by supplying the result of the verifications performed at step S34. If these verifications are satisfying, server HSRV also transmits to processor HP1 the URL download address of the application and possibly the application identifier APID. At the following steps S38 and S39, processor HP1 receives the information from server HSRV, and if the download is authorized by server HSRV, downloads the application by accessing a server WSRV at the URL address received. At step S40, processor HP1 launches the installation of the application by executing the file downloaded at step S39. At step S42, processor HP1 asks processor SE through software component NAPP to introduce application identifier APID into the list of application identifiers PAB memorized by processor SE for each payment application. At step S43, processor SE updates this list. After step S42, processor HP1 transmits to server HSRV a validation request for installing the application containing the identifier NID, cryptogram ED1 and identifier APID of the application installed (step S44). At the following step S45, server HSRV verifies cryptogram ED1. If cryptogram ED1 is correct (step S46), server HSRV memorizes that identifier NID is linked to application identifier APID in base IDDB (step S47). At the following step S48, if cryptogram ED1 is correct, server HSRV transmits to processor HP1 a message for authorizing the execution of the application installed. At the following step S49, processor HP1 updates database ARB by inserting therein identifier AP1D of the installed application, and launches the execution of the application. During its execution by processor HP1, the application may access the server of application ASRV or an associated server (at step S50), which may ask server HSRV user profile information UPRF memorized in base UPDB, on the basis of identifier NID, and ask the user if need be to complete the information, for example by displaying on a display screen of device HD1 a form to fulfill. The form displayed may be already filled-in with information about the user, already in base UPDB. The profile information input by the user may be transmitted by processor HP1 to a server linked to the application, like server ASRV or server WSRV, which forwards them to server HSRV to update database UPDB (step S51). During the execution of the application, server ASRV may execute a conventional payment transaction by accessing a bank network on the basis of user identification information obtained from identifier NID in base UPDB.

Procedures for blocking/unblocking an application and for uninstalling an application may be put at the disposal of the user. These procedures occur in a way analog to steps S33 to S37, step S33 being replaced by the emission of a corresponding block, unblock or uninstall request, and step S36 being replaced by a step of executing the request. To that end, a block state indicator may be provided at each line of the table of base IDDB associating an application identifier APID to an identifier NID of software component NAPP. If it is an application block or unblock request, server HSRV may update the state indicator corresponding to the identifiers of application APID and software component NID received from processor HP1. This state indicator may be tested before processor HP1 executes the application at step S49. If it is an uninstall request, server HSRV may suppress the line of this table associating the software component and application identifiers received from processor HP1. Admittedly, the application blocking/unblocking and uninstalling operations are performed only after server HSRV verifies cryptogram ED1 supplied by processor HP1, and the existence of a link between identifiers NID and APID in base IDDB.

Each element of list PAB memorized in processor SE may be associated to a priority number and a block indicator, accessible by a configuration command put at the disposal of the user through processor HP1. That way, if several payment applications saved in list PAD comply with identifier APID transmitted by device POI at step S5, the software component NAPP activates the non blocked payment application having the greatest priority number.

Figure 7:
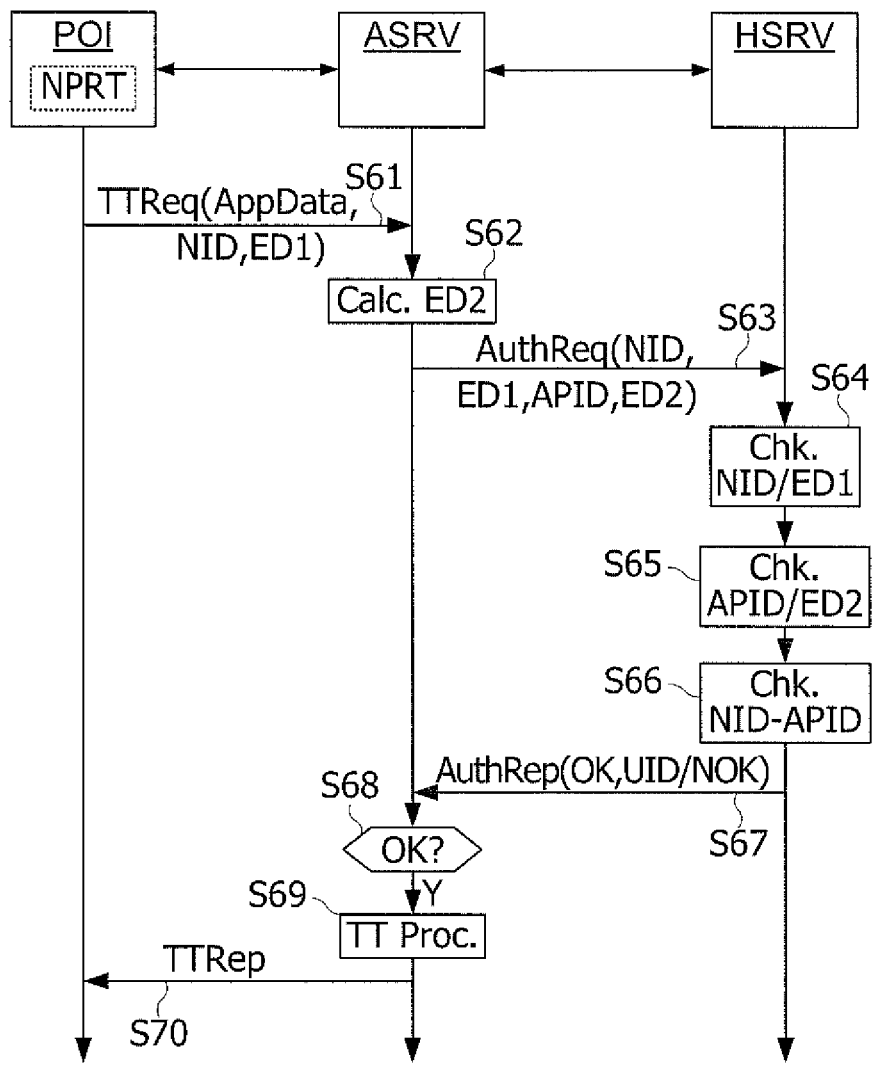
FIG. 7 shows steps of a procedure for authorizing a transaction triggered by an NFC interaction device during the execution of an application, according to one embodiment.

FIG. 7 shows a sequence of steps S61 to S70 which may be triggered by device POI at launching and executing an application after steps S9 and S49 or a payment application launched by the application activated at step S49. This sequence of steps is executed by device POI, application server ASRV and server HSRV. At step S61, device POI transmits to server ASRV a transaction request TTReq containing data regarding the application to AppData, the identifier of software component NID received at step S4, and cryptogram ED1 received at step S9. At step S62, server ASRV receives this request and launches an encryption calculation to obtain a cryptogram ED2, in particular from application identifier APID. At step S63, server ASRV emits toward server HSRV an authentication request AuthReq containing the software component identifier NID, cryptograms ED1 and ED2 and the application identifier APID. At step S64, server HSRV verifies the existence of identifier NID in database IDDB and verifies cryptogram ED1. At step S65, server HSRV verifies the existence of application identifier APID in base ARDB, and verifies cryptogram ED2. At step S66, server HSRV verifies in database IDDB that the application is linked to the identifier NID of processor SE of device HD1 connected to device POI. At step S67, server HSRV emits toward server ASRV an authentication response message AuthRep indicating the success or failure of the authentication, i.e. if cryptograms ED1, ED2 received are authentic, and if the application having the identifier APID is actually linked to identifier NID of device HD1 connected to device POI. If the authentication is a success, server HSRV also transmits if necessary, the user identifier UID to server ASRV to allow it to perform a transaction on the basis of the user identity. At step S68, server ASRV tests the authentication response message and if the authentication is a success, it executes steps S69 and S70 where it executes the transaction corresponding to the application and user, and it transmits to device POI a transaction response message TTRep to the request transmitted at step S61 Server ASRV may thus be sure of the authenticity of identifiers NID and APID.

Cryptogram ED2 may be calculated (at step 62) by applying the function used to calculate cryptogram ED1, to application identifier APID, and possibly to cryptogram ED1 and other data such as a randomly generated number. The other data used in the calculation of cryptogram ED2, and in particular the random number are transmitted with cryptogram ED2 to allow it to be verified by server HSRV. If the cryptograms are calculated by means of a symmetric encryption function or a hash function, using a secret key, cryptograms ED1, ED2 may be verified by recalculating them by means of the same secret keys and the same data used for their first calculations. The secret data are memorized in base KYDB in association with identifiers NID, APID. The data possibly used for the calculation of cryptogram ED1 may be found in base IDDB in association with identifier NID. The data possibly used for the calculation of cryptogram ED2 may be found in base ARDB in association with identifier APID. If cryptograms ED1, ED2 have been calculated by means of an asymmetric encryption algorithm, they may be verified by applying thereto the same encryption algorithm using public keys memorized in base KYDB, corresponding to the secret keys used for their calculations.

It is to be noted that user identifier UID is never transmitted or received by NFC device HD1, but only by the links between servers ASRV, HSRV which may be secured. The user anonymity may thus be protected, knowing identifier NID is insufficient to identify a user and that identifier SEID of processor SE is never transmitted during the execution of an application.

Admittedly, authentication server HSRV may in reality be made by several servers connected between them. Thus, encryption key base KYDB may be accessible through a specific server. The data of each base IDDB, UPDB, ARDB and KYDB may also be distributed into several databases accessible through different servers.

Thanks to these arrangements, installing a new application does not require installing any software component in a secure processor of NFC device HD1. Secure processor SE is personalized once for all the NFC applications susceptible of being executed by processor HP1, by receiving component NAPP associated to a unique identifier NID and one or more associated secret keys. Since only one software component NAPP may be installed in processor SE, identifier NID may be used to identify processor SE. The installation of component NAPP in processor SE does not prevent the installation or execution of other software components in processor SE. As the link between an application and device HD1 of a user is established outside device HD1, i.e. by databases IDDB, UPDB, ARDB, this link may be easily reestablished for and from another NFC device, in the event of a loss, theft or replacement of device HD1. Cryptograms ED1 and ED2 allow processor SE and the application to be authenticated. In addition, it is to be noted that the sequences of steps previously described do not involve a mobile network operator, unless possibly to establish a communication between device HD1 (of the type mobile phone) and an application download server WSRV.

It will be clear to those skilled in the art that the present invention is susceptible of various embodiments and applications. In particular, the invention is not limited to the implementation of secure applications. Thus, generating, transmitting and verifying one and/or the other of cryptograms ED1, ED2 is not necessary to implement the invention.

The invention is not limited either to NFC devices in which controller NFCC is connected to processor HP1. Indeed, controller NFCC and secure processor SE may be integrated into a chip associated to a mobile phone by any mechanical means (sticker, mobile phone cover). For example, in FIG. 5, transmitting the data necessary for the execution of an application by processor HP1 may be transmitted to processor HP1 through server ASRV connected to device POI. The application in processor HP1 may also be manually launched by the user.

The steps of downloading and installing an application in processor HP1 are not necessary either. These operations may indeed be performed during the installation of the MOS operating system into processor HP1. NFC device HD1 may thus be supplied to a user with a certain number of applications already installed in processor HP1.

In addition, according to the applications ("Reader Applications, "Card Applications"), device HD1 may establish a contactless link with an external NFC device (POI) in card mode, or in reader mode, or in "peer-to-peer" mode. Thus, the execution of the sequence of steps of FIG. 6 is not necessary performed in a synchronous way. Indeed, in particular in the case where device POI is a contactless integrated circuit, steps S61 and S70 may be performed in delay time when device POI may establish a communication with application server ASRV.

The invention claimed is:

1. A method for executing an application in a Near Field Communication (NFC) device, the method comprising:
    establishing a contactless link between a first NFC device and a second NFC device;
    transmitting, by the first NFC device through the contactless link, an identifier of the first NFC device to the second NFC device;
    transmitting, by the second NFC device through the contactless link, an application identifier to the first NFC device;
    transmitting by the second NFC device to an application server, the identifier of the first NFC device and the application identifier;
    transmitting, by the application server to an authentication server, the identifier of the first NFC device and the application identifier;
    verifying, by the authentication server, whether the identifier of the first NFC device is stored in association with the application identifier; and
    in the event the identifier of the first NFC device is stored in association with the application identifier, authorizing, by the authentication server, a transaction during the execution of the application, the authorizing including transmitting, to the application server, an identifier of a user of the first NFC device that corresponds with the identifier of the first NFC device.

2. The method of claim 1, wherein the authentication server periodically modifies the identifier of the first NFC device and updates a corresponding link between the identifier of the user and the identifier of the first NFC device.

3. The method of claim 1, wherein:
the identifier of the first NFC device includes an identifier of a secure processor of the first NFC device;
the secure processor transmits, through the contactless link, first authentication data allowing the secure processor of the first NFC device to be authenticated;
the second NFC device transmits, to the application server, the first authentication data;
the application server transmits, to the authentication server, the first authentication data and second authentication data allowing the application corresponding to the application identifier to be authenticated; and
the authentication server verifies the authentication data, the first NFC device and the second NFC device being authorized to execute the application only if the secure processor and the application are authenticated.

4. The method of claim 3, wherein:
the first NFC device transmits, to the authentication server, an application installation request including an application identifier of an application to be installed, and the first authentication data allowing the secure processor of the first NFC device to be authenticated;
the authentication server verifies the first authentication data and, if the secure processor is authenticated, transmits, to the first NFC device, an address for downloading the application to be installed; and
the first NFC device downloads the application to be installed from the received download address and installs the downloaded application.

5. The method of claim 4, wherein:
after installation of the downloaded application, the first NFC device informs the authentication server of the application installation by supplying, to the authentication server, the identifier of the installed application and the first authentication data; and
the authentication server verifies the first authentication data and, if the secure processor is authenticated, the authentication server stores the application identifier in association with the secure processor identifier of the first NFC device.

6. The method of claim 5, wherein the authentication server does not transmit, to the first NFC device, the address for downloading the application if the application identifier is already stored in the authentication server in association with the identifier of the secure processor of the first NFC device.

7. The method of claim 5, wherein the authentication server does not authorize the execution of the application by the first NFC device and the second NFC device if the application identifier is not stored in the authentication server in association with the identifier of the secure processor of the first NFC device.

8. The method of claim 3, wherein the first authentication data includes the secure processor identifier and a first cryptogram, the first cryptogram being calculated by the secure processor by applying, to the secure processor identifier, an encryption calculation using a secret key included in the secure processor.

9. The method of claim 8, wherein the second authentication data includes the secure processor identifier, the application identifier and a second cryptogram, the second cryptogram being calculated by the application server by applying an encryption calculation to the application identifier using a secret key specific to the application.

10. The method of claim 9, wherein the second cryptogram is calculated by applying the encryption calculation to the application identifier and to the first cryptogram.

11. The method of claim 9, wherein at least one of the first cryptogram and the second cryptogram is calculated using one of a symmetric encryption algorithm using the secret key, an asymmetric encryption algorithm using a private key, and a hashing function applied to the data to be ciphered and the secret key.

12. The method of claim 9, wherein verifying each of the first cryptogram and the second cryptogram is performed by recalculating the respective cryptogram from same respective data and by using an encryption key accessible to the authentication server.

13. A system for executing a secure application in a Near Field Communication (NFC) device, the system comprising:
a first NFC device including:
an NFC component configured to establish contactless communication with another NFC device; and
a secure processor coupled with the NFC component;
a second NFC device coupled with an application server and configured to execute an application with the first NFC device; and
an authentication server accessible to the application server and to the first NFC device, the system being configured to:
establish a contactless communication link between the first NFC device and the second NFC device;
transmit, from the first NFC device through the contactless link, an identifier of the first NFC device to the second NFC device;
transmit, from the second NFC device through the contactless communication link, an application identifier to the first NFC device;
transmit, from the second NFC device to the application server, the identifier of the first NFC device and the application identifier; and
transmit, from the application server to the authentication server, the identifier of the first NFC device and the application identifier,
the authentication server being configured to:
verify whether the identifier of the first NFC device is stored in association with the application identifier; and
if the identifier of the first NFC device is stored in association with the application identifier, authorize a transaction during the execution of the application by transmitting, to the application server, an identifier of a user of the first NFC device, the identifier of the user corresponding to the identifier of the first NFC device.

14. The system of claim 13, wherein the authentication server is configured to periodically modify the identifier of the first NFC device and update a corresponding link between the identifier of the user of the first NFC device and the identifier of the first NFC device.

15. The system of claim 13, wherein:
the identifier of the first NFC device includes an identifier of a secure processor of the first NFC device;
the secure processor is configured to transmit, through the contactless communication link, first authentication data for authenticating the secure processor of the first NFC device;
the second NFC device is configured to transmit, to the application server, the first authentication data;
the application server is configured to transmit, to the authentication server, the first authentication data and second authentication data for authenticating the application corresponding to the application identifier; and the authentication server is configured to verify the authentication data, and to authorize the first NFC device and the second NFC device to execute the application only if the secure processor and the application are authenticated.

16. The system of claim 15, wherein:
the first NFC device is configured to transmit to the authentication server an application installation request including an application identifier of an application to be installed, and the first authentication data for authenticating the secure processor of the first NFC device;
the authentication server is configured to verify the first authentication data and, if the secure processor is authenticated, to transmit, to the first NFC device, an address for downloading the application; and
the first NFC device is configured to:
download the application to be installed from the received download address; and
install the downloaded application.

17. The system of claim 16, wherein, the first NFC device is configured to, after installation of the downloaded application, inform the authentication server of the application installation by supplying, to the authentication server, the identifier of the installed application and the first authentication data; and
the authentication server is configured to verify the first authentication data and, if the secure processor is authenticated, to store the application identifier in association with the secure processor identifier of the first NFC device.

18. The system of claim 17, wherein the authentication server is configured to not transmit, to the first NFC device, the address for downloading the application if the application identifier is already stored in the authentication server in association with the identifier of the secure processor of the first NFC device.

19. The system of claim 17, wherein the authentication server is configured to not authorize the execution of the application by the first NFC device and the second NFC device if the application identifier is not stored in the authentication server in association with the identifier of the secure processor of the first NFC device.

20. The system of claim 15, wherein the first authentication data includes the secure processor identifier and a first cryptogram, the first cryptogram being calculated by the secure processor by applying, to the secure processor identifier, an encryption calculation using a secret key included in the secure processor.

21. The system of claim 20, wherein the second authentication data includes the secure processor identifier, the application identifier and a second cryptogram, the second cryptogram being calculated by the application server by applying an encryption calculation to the application identifier using a secret key specific to the application.

22. The system of claim 21, wherein the second cryptogram is calculated by applying the encryption calculation to the application identifier and to the first cryptogram.

23. The system of claim 21, wherein at least one of the first cryptogram and the second cryptogram is calculated using one of a symmetric encryption algorithm using the secret key, an asymmetric encryption algorithm using a private key, and a hashing function applied to the data to be ciphered and the secret key.

24. The system of claim 20, wherein verifying each of the first cryptogram and the second cryptogram is performed by recalculating the respective cryptogram from same respective data and by using an encryption key accessible to the authentication server.

25. An apparatus comprising:
a Near Field Communication (NFC) component configured to establish a contactless communication with an NFC device; and
a secure processor coupled with the NFC component,
wherein the secure processor includes a software component associated with an identifier of the software component that is distinct from an identifier of a user of the secure processor, the software component being configured to:
establish a contactless communication link with an NFC device through the NFC component;
transmit the identifier of the software component through the contactless link;
receive, through the contactless link, an application identifier;
compute authentication data using the identifier of the software component; and
transmit, through the contactless link, the authentication data, the secure processor being authorized to execute an application corresponding to the application identifier only if the identifier of the software component is linked to the application identifier in an authentication server.

26. The apparatus of claim 25, wherein the software component is configured to cause the secure processor to verify whether or not the received application identifier is included in a list of applications included in the secure processor.

27. The apparatus of claim 25, wherein the authentication data includes the software component identifier and a first cryptogram that is calculated by the secure processor by applying, to the software component identifier, an encryption calculation using a secret key included in the secure processor.

28. The apparatus of claim 27, wherein the first cryptogram is calculated by the secure processor using at least one of a symmetric encryption algorithm applied to the secret key, an asymmetric encryption algorithm using a private key, and a hash function applied to the data to be ciphered and to the secret key.

29. The apparatus of claim 25, wherein the secure processor is configured to:
store the software component identifier as a current software component identifier;
receive the software component identifier and a new identifier; and
when the received software component identifier corresponds to the stored current software component identifier:
store the new identifier as the current software component identifier; and
transmit a notification indicating that the received new identifier is stored as the current software component identifier.

* * * * *